United States Patent
Okano

(10) Patent No.: US 7,374,264 B2
(45) Date of Patent: May 20, 2008

(54) PATTERNED SUBSTRATE, AND METHOD AND APPARATUS FOR MANUFACTURING THE SAME

(75) Inventor: Kiyoshi Okano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 507 days.

(21) Appl. No.: 11/081,912

(22) Filed: Mar. 15, 2005

(65) Prior Publication Data
US 2005/0212841 A1 Sep. 29, 2005

(30) Foreign Application Priority Data
Mar. 23, 2004 (JP) .............................. 2004-084786

(51) Int. Cl.
B41J 29/38 (2006.01)
(52) U.S. Cl. ........................................ 347/12; 349/106
(58) Field of Classification Search ................ 347/12, 347/40, 43; 349/83, 92–93, 79, 104, 106, 349/107, 109; 430/7
See application file for complete search history.

(56) References Cited
U.S. PATENT DOCUMENTS
5,345,322 A * 9/1994 Fergason .................... 349/79
7,306,323 B2 * 12/2007 Silverbrook ................. 347/42
2007/0259277 A1 * 11/2007 Kobayashi .................... 430/7

FOREIGN PATENT DOCUMENTS
| JP | 10-12377 | 1/1998 |
| JP | 2003-136708 | 5/2003 |
| JP | 2005-183184 A | 7/2003 |
| JP | 2003-279723 A | 10/2003 |

OTHER PUBLICATIONS

Official communication issued in the counterpart Japanese Application No. 2004-084786, mailed on Feb. 13, 2007.
T. Shimoda et al.; Multicolor Pixel Patterning of Light-Emitting Polymers by Ink-Jet Printing; SID Digest; 1999; pp. 376-379.
Tatsuya Shimoda et al.; "Inkjet Printing of Light-Emitting Polymer Displays" MRS Bulletin; Nov. 2003; pp. 821-827.

* cited by examiner

Primary Examiner—Lamson Nguyen
(74) Attorney, Agent, or Firm—Keating & Bennett, LLP

(57) ABSTRACT

A method for manufacturing a patterned substrate includes the steps of: ejecting ink to a plurality of ink ejection portions arranged in a row by using a head having a plurality of ink ejecting means corresponding to the plurality of ink ejection portions; and drying the ejected ink. In the ink ejection step, ink is ejected so that a solid content weight of the ink in each ink ejection portion is different between an inner part and an end part of the plurality of ink ejection portions arranged in a row.

6 Claims, 9 Drawing Sheets

PATTERNED SUBSTRATE, AND METHOD AND APPARATUS FOR MANUFACTURING THE SAME

CROSS REFERENCE TO RELATED APPLICATIONS

This application claims priority under 35 U.S.C. §119 on patent application Ser. No. 2004-84786 filed in Japan on Mar. 23, 2004, the entire contents of which are hereby incorporated by reference.

BACKGROUND OF THE INVENTION

1. Field of the Invention

The present invention relates to a patterned substrate and a method and apparatus for manufacturing the same.

2. Description of the Background Art

Recently, high resolution, high image quality display devices with reduced display unevenness such as reduced luminance unevenness, reduced color unevenness and the like have been increasingly demanded. Such a demand has raised a need for improved accuracy of a patterned substrate such as a color filter substrate and an organic electroluminescent substrate. A color filter substrate is a substrate which is used in display devices such as a liquid crystal display (LCD) and an electroluminescent display using a color filter. An organic electroluminescent substrate (hereinafter, sometimes referred to as "organic EL substrate") is a substrate which is used in an organic electroluminescent display (hereinafter, sometimes referred to as "organic EL display").

Examples of a method for manufacturing a patterned substrate include a dyeing method, a pigment dispersion method, an electrodeposition method, a vacuum deposition method, a spin coating method, a dip method, a roll coating method, a doctor blade method, an ink jet method, and the like.

In the ink jet method, a matrix pattern can be relatively easily formed as compared with other methods for manufacturing a patterned substrate. Moreover, in the ink jet method, a manufacturing process is relatively short and a patterned substrate can be manufactured at low cost. The ink jet method has therefore attracted attention as a method for manufacturing various kinds of patterned substrate (for example, Japanese Laid-Open Patent Publication No. 10-12377).

In the ink jet method, a patterned substrate is formed by ejecting ink from an ink ejecting nozzle of an ink jet head to each of a plurality of ink ejection portions arranged in a matrix while scanning a substrate with the ink jet head, and then drying the ejected ink into a solid state.

For improved production efficiency, an ink jet head having a plurality of ink ejecting nozzles is usually used in the ink jet method to eject ink simultaneously to a plurality of ink ejection portions arranged in a row.

In order to improve placement accuracy of ink which is ejected from ink ejecting nozzles and to prevent mixing of ink which has been ejected to adjacent ink ejection portions, there has been proposed a technique for separating a plurality of ink ejection portions from each other by an ink-ejection-portion formation layer having a liquid repelling property (an ink repelling property) (for example, SID Digest 1999, pp. 376-379).

However, when ink is ejected simultaneously to a plurality of ink ejection portions arranged in a row by using an ink jet head having a plurality of ink ejecting nozzles, an ink layer formed in an inner part of the row (hereinafter, sometimes simply referred to as "inner part") and an ink layer formed in end parts of the row (hereinafter, sometimes simply referred to as "end parts") have different thicknesses (MRS BULLETIN/NOVEMBER 2003, pp. 821-827).

Hereinafter, the reason why ink layers in an inner part and end parts of a row have different thicknesses will be described in detail.

FIG. 6 is a schematic plan view illustrating the step of ejecting ink to ink ejection portions 307 on a main substrate 301 (not shown in FIG. 6) by a conventional ink jet method.

FIG. 7 is an enlarged schematic cross-sectional view taken along line VI-VI in FIG. 6.

FIG. 8 is a schematic cross-sectional view of the main substrate 301 having ink layers 308 formed thereon by the conventional ink jet method.

FIG. 9 is an enlarged cross-sectional view of a portion surrounded by dotted line VIII in FIG. 8.

For convenience, in FIGS. 8 and 9, the thickness of ink layers 308 relative to a bank 303 is shown to be larger than their actual thickness. Actually, the bank 303 is about 1 μm to about 5 μm high and the ink layers 308 are about 10 nm to about 200 nm thick.

A plurality of ink ejection portions 307 arranged in a matrix are formed on the main substrate 301. The plurality of ink ejection portions 307 are separated from each other by the bank 303. A light shielding layer 302 is formed between the main substrate 301 and the bank 303. A region of each ink ejection portion 307 in which the light shielding layer 302 is not formed is an effective region PD3. Note that an "effective region" is a region which is to be actually used as a device. For example, provided that a patterned substrate is a color filer substrate or an organic EL substrate, an "effective region" refers to a display aperture region.

The ink layers 308 are formed by ejecting ink droplets 304 to the ink ejection portions 307 on the main substrate 301 by using an ink jet head 306 and drying the ink droplets 304 which have been ejected to the ink ejection portions 307 into a solid state. The ink jet head 306 has a plurality of ink ejecting nozzles 305. The plurality of ink ejecting nozzles 305 are provided corresponding to a plurality of ink ejection portions 307 arranged in a row. The plurality of ink ejecting nozzles 305 can thus eject ink droplets 304 simultaneously to a plurality of ink ejection portions 307 arranged in a row. Ink droplets 304 are ejected to a plurality of ink ejection portions 307 arranged in a matrix in a target block B3 while scanning the main substrate 301 in the Y-axis direction with the ink jet head 306. The ink jet head 306 is then moved by one block B3 in the X-axis direction, and ink droplets 304 are similarly ejected to a plurality of ink ejection portions 307 in the next target block B3 while scanning the main substrate 301 in the Y-axis direction with the ink jet head 306.

A patterned substrate is thus produced by ejecting ink droplets 304 to all the ink ejection portions 307 while scanning the main substrate 301 in the Y-axis direction with the ink jet head 306 a plurality of times. Note that a block B3 is a region of the main substrate 301 in which the ink layer 308 can be formed on each ink ejection portion 307 each time the main substrate 301 is scanned in the Y-axis direction with the ink jet head 306.

By using the ink jet head 306, ink droplets 304 are ejected to the ink ejection portions 307 on a block B3 by block B3 basis. In this case, when the ink droplet 304 dries into a solid state, a vapor pressure of a volatile component of ink in the periphery of an ejected ink droplet 304 is different between an inner part S and end parts E of the block B3. In general, the vapor pressure of the volatile component of ink is uniform in the inner part of the block B3. In the end parts of the block B3, however, the vapor pressure of the volatile component of ink becomes lower toward both ends of the block B3. Ink droplets 304 therefore dry at a different rate between the inner part S and the end parts E. As a result, the shape of the ink layer 308 is different between the inner part S and the end parts E.

Conventionally, a solid content weight of ink which is ejected to each ink ejection portion 307 is approximately the same. Therefore, if the shape of the dried ink layer 308 is different, the thickness in the effective region PD3 of the ink layer 308 is also different. Accordingly, the ink layers 308 formed in the inner part S have approximately the same thickness H7, while the ink layers 308 formed in the end parts E become thinner toward the ends of the block B3. For example, as shown in FIG. 9, the thickness H7 of the ink layers 308 in the inner part S and thicknesses H8 and H9 of the ink layers 308 in the end part E become smaller in this order.

In FIGS. 8 and 9, the ink layers 308 in the end parts E have a concave shape. However, the ink layers 308 in the end parts E need not necessarily have a concave shape. The ink layers 308 in the end parts E may have a more convex shape than that of the ink layers 308 in the inner part S depending on manufacturing conditions.

In FIGS. 8 and 9, only two ink layers 308 in each end part E are shown to have a different shape from that of the ink layers 308 in the inner part S. Depending on manufacturing conditions, however, only one ink layer 308 or three or more ink layers 308 in each end part E may have a different shape from that of the ink layers 308 in the inner part S.

SUMMARY OF THE INVENTION

The present invention is made in view of the foregoing, and it is an object of the present invention to provide a uniform patterned substrate with reduced pattern unevenness in which ink layers have approximately the same thickness.

According to one aspect of the invention, a method for manufacturing a patterned substrate having a main substrate, an ink-ejection-portion formation layer formed on the main substrate for forming a plurality of ink ejection portions on the main substrate, and an ink layer formed on each of the plurality of ink ejection portions, includes the steps of: ejecting ink to a plurality of ink ejection portions arranged in a row by using a head having a plurality of ink ejecting means corresponding to the plurality of ink ejection portions; and drying the ink which has been ejected in the ink ejection step. In the ink ejection step, ink is ejected so that a solid content weight of the ink in each ink ejection portion is different between an inner part and an end part of the plurality of ink ejection portions arranged in a row.

When ink is ejected simultaneously to a plurality of ink ejection portions arranged in a row as described above, a vapor pressure of a volatile component of the ink is different between the inner part and the end part of the plurality of ink ejection portions in the drying step. Ink droplets therefore dry into a solid state at a different rate between the inner part and the end part. Accordingly, the shape of the ink layer is different between the inner part and the end part. In the manufacturing method of the present invention, the solid content weight of the ink to be ejected to the ink ejection portions in the inner part and the solid content weight of the ink to be ejected to the ink ejection portions in the end part are appropriately adjusted. The ink layers in the inner part and the ink layers in the end part can therefore be made to have approximately the same thickness in an effective region. As a result, a uniform patterned substrate with reduced pattern unevenness can be implemented. In the specification, the "solid content" refers to a material remaining after ink ejected to the main substrate is dried and baked.

In the ink ejection step of the manufacturing method of the present invention, a ratio of a solid content weight of the ink to be ejected to each of the plurality of ink ejection portions to an average solid content weight of the ink may be in a range from about 0.3 to about 3.0. In this case the ink layers in the inner part and the ink layers in the end part can be made to have approximately the same thickness. As a result, a uniform patterned substrate with reduced pattern unevenness can be implemented.

When the ink layers in the end part have a concave shape, the ratio of the solid content weight of the ink to be ejected to each ink ejection portion in the end part to the average solid content weight of the ink is preferably more than about 1.0 and about 3.0 or less, and more preferably, in the range of about 1.2 to about 3.0. On the other hand, when the ink layers in the end part have a convex shape, the ratio of the solid content weight of the ink to be ejected to each ink ejection portion in the end part to the average solid content weight of the ink is preferably about 0.3 or more and less than about 1.0, and more preferably, in the range of about 0.3 to about 0.8. In the specification, the "average solid content weight of the ink" refers to an average value of the respective weights of the solid content of the ink which has been ejected to all the ink ejection portions.

In the ink ejection step of the manufacturing method of the present invention, a solution amount per ink droplet to be ejected to each ink ejection portion may be made different between the inner part and the end part of the plurality of ink ejection portions arranged in a row. In other words, the same number of ink droplets having different droplet amounts may be ejected to the ink ejection portions in the end part and the ink ejection portions in the inner part.

In this case, the solid content weight of the ink to be ejected to each ink ejection portion can be appropriately adjusted in the inner part and the end part. The ink layers in the inner part and the ink layers in the end part can thus be made to have approximately the same thickness. As a result, a uniform patterned substrate with reduced pattern unevenness can be implemented.

In the ink ejection step of the manufacturing method of the present invention, a number of ink droplets to be ejected to each ink ejection portion may be made different between the inner part and the end part of the plurality of ink ejection portions arranged in a row.

In this case, the solution amount of the ink to be ejected to each ink ejection portion can be made different between the inner part and the end part. Since the solid content weight of the ink to be ejected to each ink ejection portion can be appropriately adjusted in the inner part and the end part, the ink layers in the inner part and the ink layers in the end part can be made to have approximately the same thickness. As a result, a uniform patterned substrate with reduced pattern unevenness can be implemented.

In the ink ejection step of the manufacturing method of the present invention, a solid content concentration of the ink to be ejected to each ink ejection portion may be made different between the inner part and the end part of the plurality of ink ejection portions arranged in a row.

In this case, the solid content weight of the ink to be ejected to each ink ejection portion can be appropriately adjusted in the inner part and the end part. The ink layers in the inner part and the ink layers in the end part can therefore be made to have approximately the same thickness. As a result, a uniform patterned substrate with reduced pattern unevenness can be implemented.

In the specification, the "solid content concentration" refers to percent by weight of a material remaining after the ink ejected to an ink ejection portion is dried and baked with respect to the entire ink droplet.

In the manufacturing method of the present invention, the patterned substrate may be an organic electroluminescent (EL) substrate or a color filter substrate.

According to another aspect of the present invention, an apparatus for manufacturing a patterned substrate having a main substrate, an ink-ejection-portion formation layer formed on the main substrate for forming a plurality of ink ejection portions on the main substrate, and an ink layer formed on each of the plurality of ink ejection portions includes a head having a plurality of ink ejecting means arranged in a row. A solid content weight of ink to be ejected from the ink ejecting means to each ink ejection portion is different between an inner part and an end part of the head.

By the ink ejecting means of the manufacturing apparatus of the present invention, the solid content weight of the ink to be ejected from the ink ejecting means to each ink ejection portion can be made different between the inner part and the end part of the head. Therefore, in the patterned substrate produced by the manufacturing method of the present invention, the ink layers which are formed by the ink ejecting means in the inner part of the head and the ink layers which are formed by the ink ejecting means in the end part of the head can be made to have approximately the same thickness. This manufacturing apparatus can thus produce a uniform patterned substrate with reduced pattern unevenness.

Each of the plurality of ink ejecting means may be an ink ejecting nozzle, and an internal diameter of the ink ejecting nozzle may be different between the inner part and the end part of the head.

In this case, a solution amount of an ink droplet to be ejected from each ink ejecting nozzle can be made different between the inner part and the end part of the head.

Therefore, the solid content weight of the ink to be ejected from each ink ejecting means can be made different between the inner part and the end part of the head. The ink layers which are formed by the ink ejecting nozzles in the inner part of the head and the ink layers which are formed by the ink ejecting nozzles in the end part of the head can therefore be made to have approximately the same thickness. As a result, a uniform patterned substrate with reduced pattern unevenness can be implemented.

A solid content concentration of the ink to be ejected from the ink ejecting means to each ink ejection portion may be different between the inner part and the end part of the head.

In this case, the solid content weight of the ink to be ejected from each ink ejecting means to each ink ejection portion can be made different between the inner part and the end part of the head. The ink layers which are formed by the ink ejecting nozzles in the inner part of the head and the ink layers which are formed by the ink ejecting nozzles in the end part of the head can therefore be made to have approximately the same thickness. As a result, a uniform patterned substrate with reduced pattern unevenness can be implemented.

According to still another aspect of the present invention, a patterned substrate includes a main substrate, an ink-ejection-portion formation layer formed on the main substrate for forming a plurality of ink ejection portions on the main substrate, and an ink layer formed on each of the plurality of ink ejection portions. The plurality of ink layers on the main substrate have approximately a same thickness.

The patterned substrate of the present invention is produced by the manufacturing method of the present invention, and the plurality of ink layers on the main substrate have approximately the same thickness. Accordingly, the patterned substrate of the present invention is a uniform substrate with reduced pattern unevenness. A display device with reduced display unevenness such as reduced luminance unevenness and reduced color unevenness can be implemented by using this patterned substrate.

In the specification, the "thickness of an ink layer" refers to an average thickness in those regions of the ink layers which are actually used as a device (effective regions). For example, when the patterned substrate is a color filter substrate or an organic EL substrate, the "thickness of an ink layer" refers to an average thickness in respective display aperture portions of the ink layers.

In the patterned substrate of the present invention, a ratio of a thickness of each of the plurality of ink layers to an average thickness is preferably in a range of about 0.9 to about 1.1.

A uniform patterned substrate with reduced unevenness in which the ratio of the thickness of each of the plurality of ink layers to the average thickness is in the range of about 0.9 to about 1.1 has never been able to be manufactured by the conventional methods. The manufacturing method of the present invention is the first one which enables manufacturing of such a patterned substrate. A display device with reduced display unevenness such as reduced luminance unevenness and reduced color unevenness, which has never been able to be manufactured, can be implemented by using this patterned substrate.

In this specification, the "average thickness" refers to an average value of the thicknesses of all the ink layers.

In the patterned substrate of the present invention, the plurality of ink layers may include an ink layer having a concave shape and/or an ink layer having a convex shape. In the patterned substrate of the present invention, the plurality of ink layers may include an ink layer in which a solid content weight of ink is relatively large and an ink layer in which a solid content weight of ink is relatively small.

In the patterned substrate of the present invention, the plurality of ink layers may be arranged in a matrix so that a column of ink layers in which a solid content weight of the ink is approximately same forms a row of ink layers in which a solid content weight of the ink is progressively varied.

In the patterned substrate of the present invention, a ratio of a solid content weight of the ink in each of the plurality of ink layers to an average solid content weight of the ink may be in a range of about 0.3 to about 3.0.

The patterned substrate of the present invention may be a color filter substrate or an organic electroluminescent substrate.

A display device according to yet another aspect of the present invention is a display device using the patterned substrate of the present invention.

As described above, the patterned substrate of the present invention is a uniform substrate with reduced pattern unevenness. A display device using the patterned substrate of the present invention can therefore implement high quality image display with reduced display unevenness such as reduced luminance unevenness, color unevenness and the like.

The display device of the present invention may be a display device using a color filter substrate of the present invention or an organic electroluminescent substrate of the present invention. The display device of the present invention may be of a liquid crystal display type or an organic electroluminescent display type.

DETAILED DESCRIPTION OF THE INVENTION

Hereinafter, embodiments of the present invention will be described in detail with reference to the accompanying drawings.

Although an organic electroluminescent (EL) substrate is described in the embodiments, the present invention is not limited to the organic EL substrate.

Figure 1:
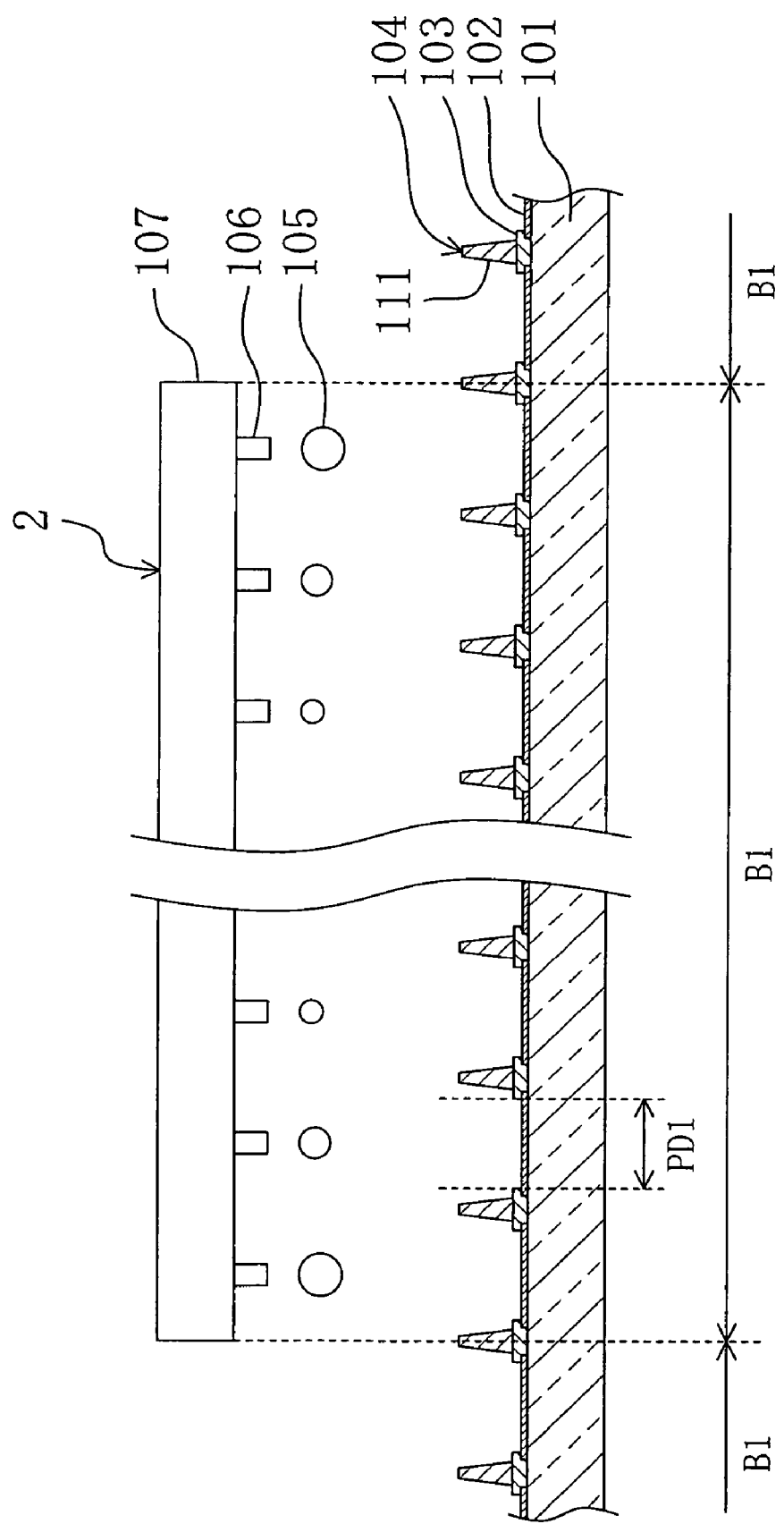
FIG. 1 is a schematic cross-sectional view illustrating a method for manufacturing an organic EL substrate according to the present invention.

FIG. 1 is a schematic cross-sectional view illustrating a method for manufacturing an organic EL substrate 1 according to the present invention.

Figure 2:
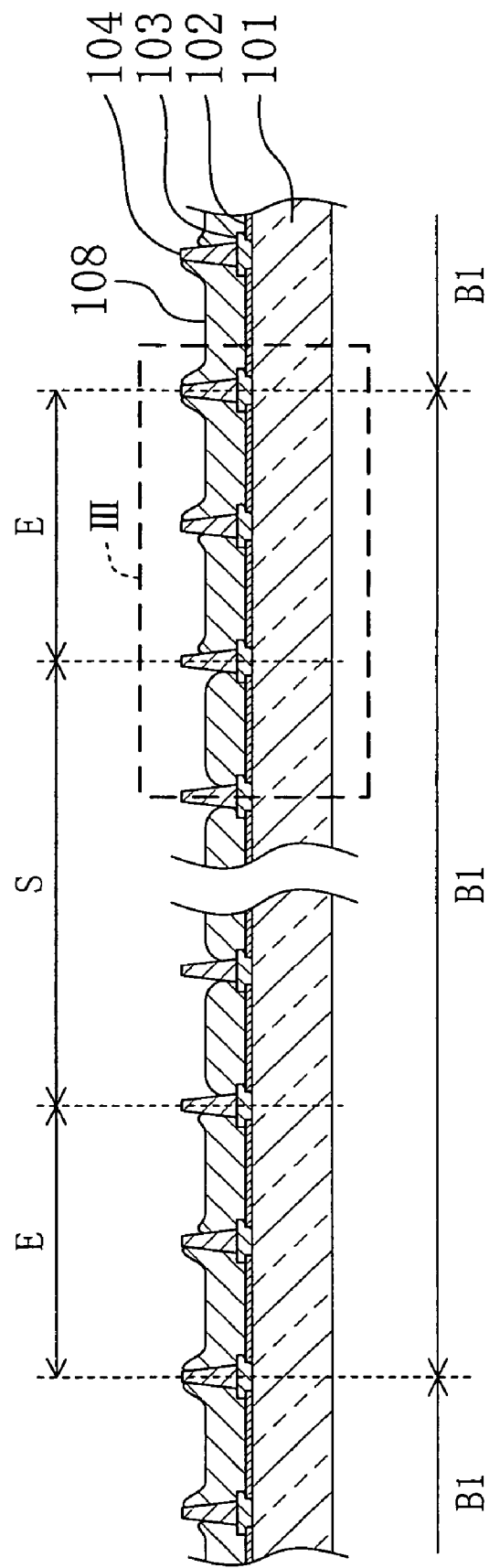
FIG. 2 is a schematic cross-sectional view showing hole transporting layers formed by applying ink containing a hole transporting material to a plurality of ink ejection portions by the manufacturing method of the present invention.

FIG. 2 is a schematic cross-sectional view showing hole transporting layers 108 formed by applying ink containing a hole transporting material to a plurality of ink ejection portions 111 by the manufacturing method of the present invention.

Figure 3:
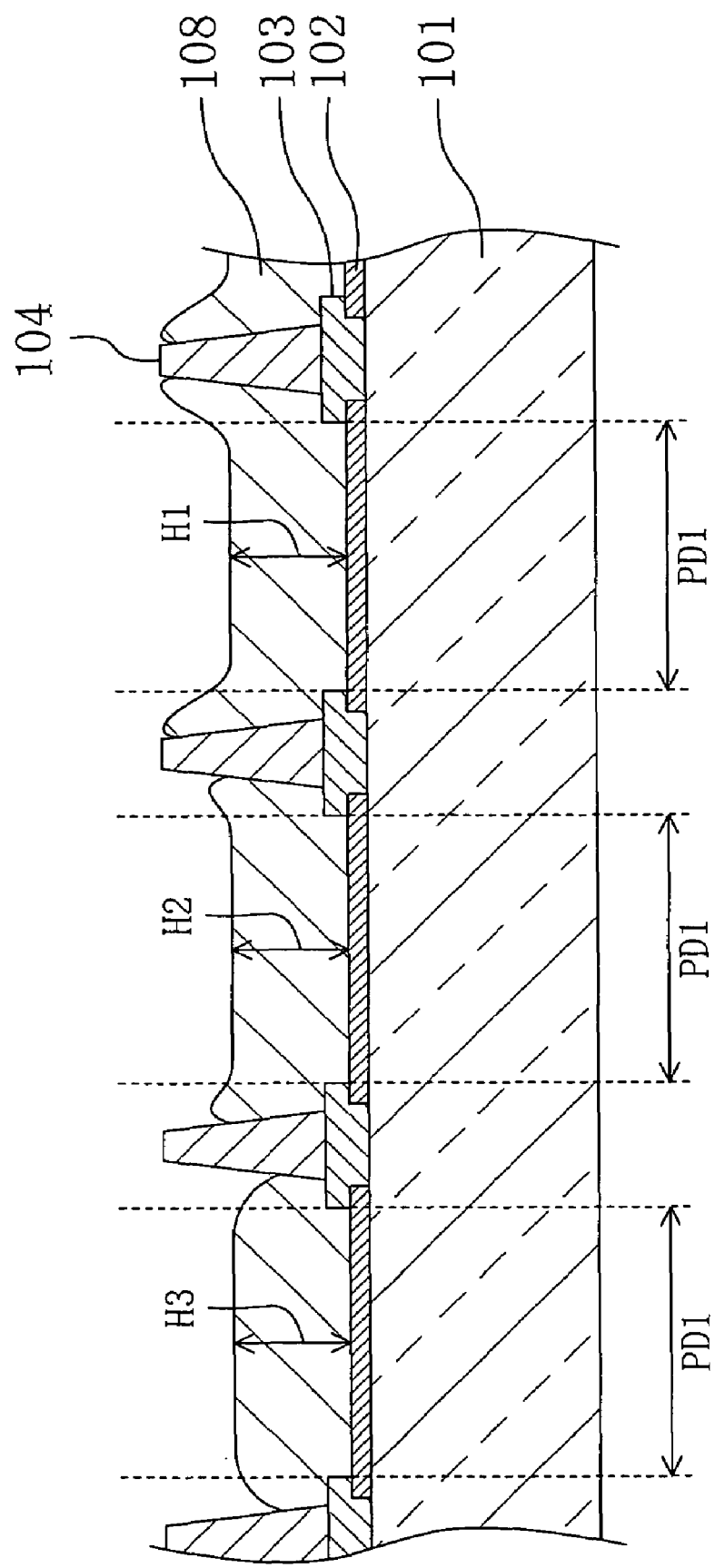
FIG. 3 is an enlarged cross-sectional view of a portion surrounded by dotted line III in FIG. 2.

FIG. 3 is an enlarged cross-sectional view of a portion surrounded by dotted line III in FIG. 2.

Figure 4:
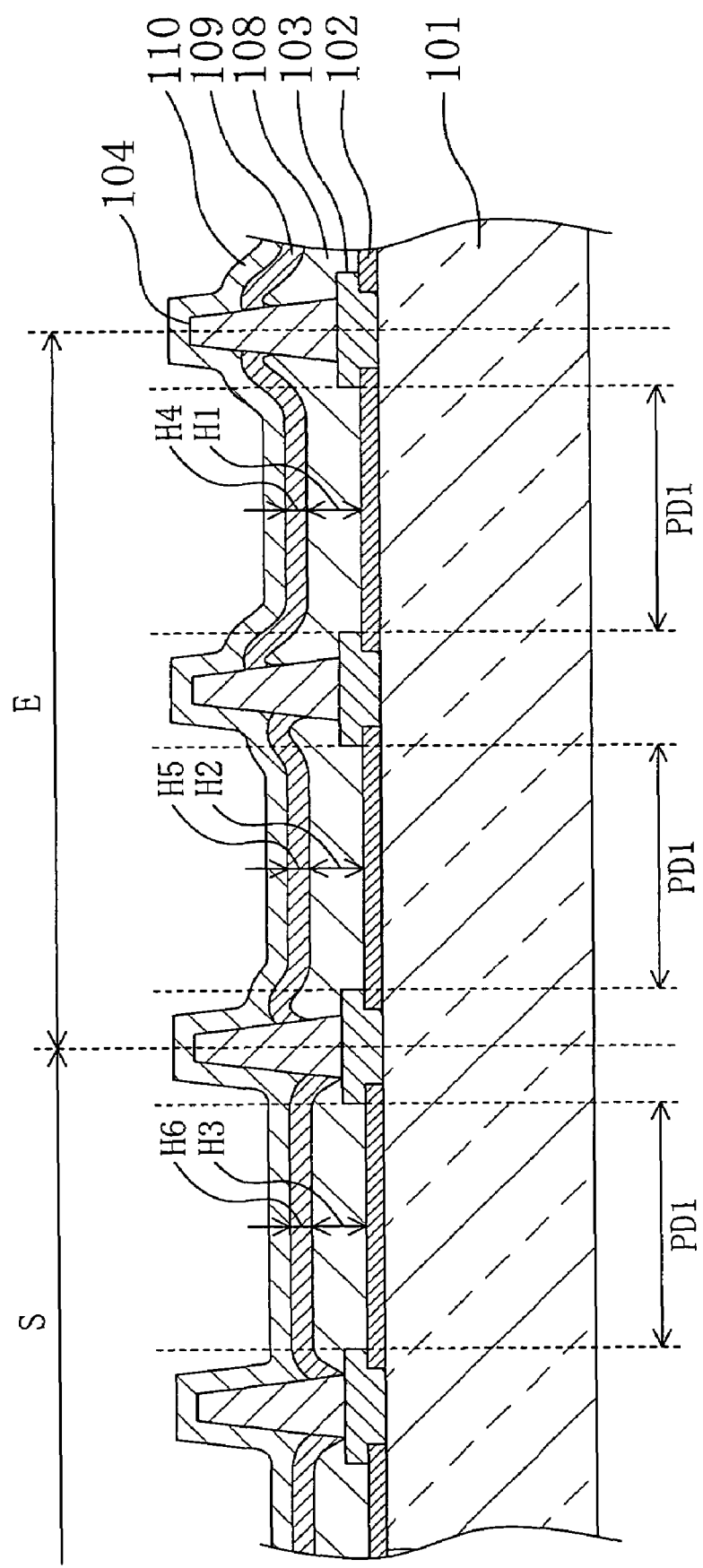
FIG. 4 is a schematic cross-sectional view of an organic EL substrate manufactured by the manufacturing method of the present invention.

FIG. 4 is a schematic cross-sectional view of an organic EL substrate 1 manufactured by the manufacturing method of the present invention.

For convenience, in FIGS. 2, 3 and 4, respective thicknesses of hole transporting layers 108 and light emitting layers 109 relative to a bank 104 are shown to be larger than their actual thicknesses. Actually, the bank 104 is about 1 μm to about 5 μm high, and each of the hole transporting layers 108 and the light emitting layers 109 is about 10 nm to about 200 nm thick.

First, lower electrodes 102 are formed in a matrix on a main substrate 101. For example, the lower electrodes 102 can be formed from a metal such as Ag or Al, an inorganic oxide such as indium tin oxide (ITO), and the like. Preferably, the thickness of a thin film such as ITO is in the range of about 100 nm to about 300 nm. For example, the lower electrodes 102 can be formed by: forming a thin film such as ITO on the main substrate 101 by a sputtering method; and then patterning this thin film into a desired layer shape by a series of photoresist processes including photoresist application, prebaking, exposure, development, postbaking, etching, and photoresist removal.

In order to make the lower electrodes 102 lyophilic (in order to improve an affinity of the lower electrodes 102 with ink containing a hole transporting material, the ink which is to be ejected to the lower electrodes 102 in a manufacturing process described below), a treatment for providing a lyophilic property to the lower electrodes 102 may be conducted by using UV/$O_3$ or the like. By making the lower electrodes 102 lyophilic, adhesion of the ink to the lower electrodes 102 can be improved and more uniform hole transporting layers 108 can be formed. As a result, a less defective organic EL substrate 1 can be manufactured.

After the lower electrodes 102 are formed, an insulating layer 103 for insulating adjacent lower electrodes 102 from each other is formed on the main substrate 101. For example, the insulating layer 103 is formed from silica, silicon nitride or the like. Preferably, the thickness of the insulating layer 103 is in the range of about 100 nm to about 300 nm. For example, the insulating layer 103 can be formed by: forming a thin film such as $SiO_2$ on the main substrate 101 having the lower electrodes 102 thereon by a film formation technique such as a sputtering method; and then patterning this thin film into a desired layer shape by a series of photoresist processes including photoresist application, prebaking, exposure, development, postbaking, etching, and photoresist removal.

After the insulating film 103 is formed, a bank 104 is formed on the main substrate 101 so as to separate a plurality of ink ejection portions 111 from each other. Preferably, the bank 104 is formed from a material whose shape, properties and the like are less likely to change by heating. Examples of a material having excellent heat resistance include a photosensitive polyimide, an acrylic resin, a metallyl resin, a novolak resin, and the like.

More preferably, the bank 104 is formed from a photosensitive resin. By forming the bank 104 from a photosensitive resin, the bank 104 can be patterned by a photolithography process. The bank 104 can therefore be easily patterned without conducting an etching process, a removal process, and the like.

For example, the bank 104 can be formed by: forming a thin film such as a photosensitive polyimide on the main substrate 101 having the insulating layer 103 thereon by a spin coating method or the like; and then patterning this thin film into a desired layer shape by a series of photoresist processes including photoresist application, prebaking, exposure, development, postbaking, etching, and photoresist removal.

In order to make the bank 104 liquid-repelling (in order to reduce an affinity of the bank 104 with both ink containing a hole transporting material, the ink which is to be ejected to the ink ejection portions 111 in a manufacturing process described below, and ink containing a light emitting material), a treatment for providing a liquid-repelling property to the bank 104 is preferably conducted by using a $CF_4$ plasma or the like. By making the bank 104 liquid-repelling, misplacement of ink and mixing of adjacent ink layers can be prevented. As a result, uniform hole transporting layers 108 and uniform light emitting layers 109 can be formed with reduced unevenness.

As shown in FIG. 1, the hole transporting layers 108 are formed by ejecting ink containing a hole transporting material to a plurality of ink ejection portions 111 by using the ink jet head 107. Examples of the hole transporting material include poly(3,4-ethylenedioxythiophene)/poly(styrenesulfonate) (PEDOT/PSS), polyaniline, and the like. Ink to be ejected to the ink ejection portions 111 can be prepared by dispersing a hole transporting material such as PEDOT/PSS in water and adding alcohol or the like to the resultant dispersion in order to adjust surface tension and viscosity.

Hereinafter, the step of ejecting ink containing a hole transporting material to a plurality of ink ejection portions 111 by using the ink jet head 107 will be described in detail (hereinafter, this step is sometimes referred to as the "ink ejection step").

The ink jet head 107 used in the ink ejection step has a plurality of ink ejecting nozzles 106 as ink ejecting means. The plurality of ink ejecting nozzles 106 are provided corresponding to a plurality of ink ejection portions 111 arranged in a row. The ink jet head 107 therefore can eject ink droplets 105 simultaneously to a plurality of ink ejection portions 111 arranged in a row. Note that a block B1 refers to a region of the main substrate 101 in which ink droplets 105 can be ejected to each ink ejection portion 111 each time the main substrate 101 is scanned in the Y-axis direction with the ink jet head 107.

In the ink ejection step, ink droplets 105 containing a hole transporting material are first ejected to the ink ejection portions 111 in a target block B1 while scanning the main substrate 101 in the Y-axis direction with the ink jet head 107. The ink jet head 107 is then moved by one block B1 in the X-axis direction, and ink droplets 105 are similarly ejected to the ink ejection portions 111 in the next target block B1 while scanning the main substrate 101 in the Y-axis direction with the ink jet head 107.

By repeatedly conducting the process of ejecting ink droplets 105 to ink ejection portions 111 on a block B1 by block B1 basis while scanning the main substrate 101 in the Y-axis direction with the ink jet head 107, ink droplets 105 are ejected to all the ink ejection portions 111 on the main substrate 101. Thereafter, the ink droplets 105 which have been ejected to the ink ejection portions 111 are dried (drying step). An organic EL substrate 1 is thus completed.

As described above, when ink droplets 105 are ejected simultaneously to a plurality of ink ejection portions 111, a vapor pressure of a volatile component of ink in the periphery of a hole transporting layer 108 is different between an inner part S and end parts E. An ejected ink droplet 304 of a hole transporting layer 108 therefore dries at a different rate between the inner part S and the end parts E. As a result, the shape of the hole transporting layer 108 is different between the inner part S and the end parts E.

In the ink ejection step of the present embodiment, however, the solid content weight of the ink to be ejected to each ink ejection portion 111 is made different between the inner part S and the end parts E. The thickness H3 in the effective region PD1 of each hole transporting layer 108 of the inner part S can therefore be made approximately the same as the thickness H1, H2 in the effective region PD1 of each hole transporting layer 108 of the end parts E. As a result, a uniform organic EL substrate 1 with reduced pattern unevenness can be manufactured.

In the present embodiment, the hole transporting layers 108 in the end parts E have a concave shape, as shown in FIGS. 2 and 3. Therefore, the solid content weight of the ink to be ejected to each ink ejection portion 111 is made larger in the end parts E than in the inner part S. Preferably, the ratio of the solid content weight of the ink to be ejected to each ink ejection portion 111 in the end parts E to an average solid content weight of the ink is more than about 1.0 and about 3.0 or less. More preferably, this ratio is in the range of about 1.2 to about 3.0.

In the present embodiment, the hole transporting layers 108 in the end parts E have a concave shape. However, the hole transporting layers 108 in the end parts E may have a convex shape depending on manufacturing conditions. When the hole transporting layers 108 in the end parts E have a convex shape, it is preferable that the solid content weight of the ink to be ejected to each ink ejection portion 111 is smaller in the end parts E than in the inner part S. This enables the thickness of the hole transporting layers 108 in the end parts E to be approximately the same as that of the hole transporting layers 108 in the inner part S.

When the hole transporting layers 108 in the end parts E have a convex shape, the ratio of the solid content weight of the ink to be ejected to each ink ejection portion 111 in the end parts E to the average solid content weight of the ink is preferably about 0.3 or more and less than about 1.0. More preferably, this ratio is in the range of about 0.3 to about 0.8.

For example, the solid content weight of the ink to be ejected to each ink ejection portion 111 in the end parts E can be determined experimentally. More specifically, this weight can be determined by the following method:

First, a plurality of organic EL substrate samples are produced by varying the ratio of the solid content weight of the ink to be ejected to each ink ejection portion 111 in the end parts E to the average solid content weight of the ink. For each sample, the thickness of the hole transporting layer 108 is measured both in the inner part S and the end parts E.

Based on the measurement result, the solid content weight of the ink to be ejected to each ink ejection portion 111 in the end parts E can be determined so as to minimize the difference between the thickness of the hole transporting layer 108 in the inner part S and the thickness of the hole transporting layer 108 in the end parts S.

The solid content weight of the ink to be ejected to each ink ejection portion 111 in the end parts E can be made different from that of the ink to be ejected to each ink ejection portion 111 in the inner part S by any means.

For example, the solid content weight of the ink to be ejected to each ink ejection portion 111 in the end parts E can be made different from that of the ink to be ejected to each ink ejection portion 111 in the inner part S by making the solution amount of an ink droplet 105 to be ejected to each ink ejection portion 111 different between the end parts E and the inner part S. For example, this can be implemented by making the internal diameter of the ink ejecting nozzles 106 corresponding to the ink ejection portions 111 in the end parts E different from that of the ink ejecting nozzles 106 corresponding to the ink ejection portions 111 in the inner part E.

By varying the internal diameter of the ink ejecting nozzles 106, the solution amount of an ink droplet 105 can be continuously changed. This enables fine adjustment of the solution amount of an ink droplet 105, and thus enables more precise adjustment of the thickness of the hole transporting layers 108 in the end parts E and the thickness of the hole transporting layers 108 in the inner part S. As a result, a uniform organic EL substrate 1 with reduced pattern unevenness can be implemented.

Alternatively, the solid content weight of the ink to be ejected to each ink ejection portion 111 in the end parts E can be made different from that of the ink to be ejected to each ink ejection portion 111 in the inner part S by making the number of ink droplets 105 to be ejected to each ink ejection portion 111 different between the end parts E and the inner part S. For example, in order to make the solid content weight of the ink to be ejected to each ink ejection portion 111 in the end parts E 1.5 times that of the ink to be ejected to each ink ejection portion 111 in the inner part S, three ink droplets 105 can be ejected to each ink ejection portion 111 in the end parts E and two ink droplets 105 can be ejected to each ink ejection portion 111 in the inner part S.

In this case, the solid content weight of the ink to be ejected to each ink ejection portion 111 in the end parts E can be easily made different from that of the ink to be ejected to each ink ejection portion 111 in the inner part S without physically altering a manufacturing apparatus, that is, by, for example, merely changing the sequence of the ink ejection step.

Alternatively, the solid content weight of the ink to be ejected to each ink ejection portion 111 in the end parts E can be made different from that of the ink to be ejected to each ink ejection portion 111 in the inner part S by making the solid content concentration of an ink droplet 105 to be ejected to each ink ejection portion 111 different between the end parts E and the inner part S.

In this way, the solid content weight of the ink to be ejected to each ink ejection portion 111 can be adjusted by: adjusting the solution amount of an ink droplet 105 to be ejected to each ink ejection portion 111; adjusting the number of ink droplets 105 to be ejected to each ink ejection portion 111; adjusting the solid content concentration of the ink to be ejected to each ink ejection portion 111; or the like. However, two or more of these methods may be combined in the present invention.

After the hole transporting layers 108 are formed, light emitting layers 109 having the same matrix pattern as that of the hole transporting layers 108 are formed on the main substrate 101 by ejecting ink containing a light emitting material to the plurality of ink ejection portions 111. Examples of the light emitting material include polyfluorene, poly(p-phenylenevinylene), polyvinylcarbazole, polyarylene, polyspirofluorene, and the like. For example, ink containing a light emitting material can be formed by dissolving a light emitting material such as a polyfluorene derivative in an organic solvent such as an aromatic hydrocarbon in order to adjust surface tension and viscosity.

The light emitting layers 109 can be formed by the same ink ejection step and the same drying step as those for forming the hole transporting layers 108. By using the same ink ejection step and the same drying step, the light emitting layers 109 have the same thickness H4, H5, H6 both in the end parts E and in the inner part S (see FIG. 4). Accordingly, a uniform organic EL substrate 1 with reduced pattern unevenness can be implemented.

After the light emitting layers 109 are formed, an upper electrode 110 is formed on the main substrate 101. Examples of a material of the upper electrode 110 include an inorganic oxide containing Ca, Al, and the like.

Preferably, the upper electrode 110 is a lamination of a layer containing a low work function material and a layer containing a conductive material. Examples of the low work function material include an alkali metal oxide, an alkali metal fluoride, an alkaline earth metal oxide, an alkaline earth metal fluoride, and the like. Examples of the conductive material include Al, ITO, and the like. Since the lower electrode 110 has a layer containing a low work function material, high electron injection efficiency to the light emitting layer 109 can be implemented. Moreover, the layer containing a low work function material which is generally likely to be oxidized is covered with the layer containing a conductive material such as Al or ITO. Oxidation of the low work function material can therefore be suppressed. As a result, a high-luminance organic EL substrate 1 having a longer product life can be implemented.

For example, the upper electrode 110 can be formed by a vacuum deposition method (resistance heating, electron beams), and the like.

After the upper electrode 110 is formed, a glass sealing cap may be attached to the main substrate 101 by a sealing resin or the like. This enables the light emitting layers 109 and the like which cause severe degradation of image display capability due to oxidation to be effectively shielded from outside air. As a result, an organic EL substrate 1 having a long product life can be implemented.

In the organic EL substrate 1 produced by the manufacturing method of the present invention, a plurality of hole transporting layers 108 formed on the main substrate 101 have approximately the same thickness, and a plurality of light emitting layers 109 formed on the main substrate 101 have approximately the same thickness. Accordingly, the organic EL substrate 1 has reduced unevenness and provides uniform light emission from the plurality of light emitting layers 109.

It is preferable that the ratio of the thickness of each hole transporting layer 108 to an average thickness is in the range of about 0.9 to about 1.1. It is also preferable that the ratio of the thickness of each light emitting layer 109 to the average thickness is in the range of about 0.9 to about 1.1. This enables implementation of an organic EL substrate 1 having more reduced unevenness and providing more uniform light emission from the plurality of light emitting layers 109.

The organic EL substrate 1 may include hole transporting layers 108 and light emitting layers 109 which are recessed toward the main substrate 101 and/or projecting from the main substrate 101. In this case, the plurality of hole transporting layers 108 have approximately the same thickness in the effective region PD1, and the plurality of light emitting layers 109 have approximately the same thickness in the effective region PD1. Therefore, an organic EL substrate 1 providing uniform light emission can be implemented.

The organic EL substrate 1 may include a hole transporting layer 108 in which the solid content weight of the ink is relatively large and a hole transporting layer 108 in which the solid content weight of the ink is relatively small.

The organic EL substrate 1 may include a light emitting layer 109 in which the solid content weight of the ink is relatively large and a light emitting layer 109 in which the solid content weight of ink is relatively small.

A column of hole transporting layers 108 in which the solid content weight of the ink is approximately the same may form a row of hole transporting layers 108 in which the solid content weight of the ink is progressively varied.

A column of light emitting layers 109 in which the solid content weight of the ink is approximately the same may form a row of light emitting layers 109 in which the solid content weight of the ink is progressively varied.

The ratio of the solid content weight of the ink in each hole transporting layer 108 to the average solid content weight of the ink may be in the range of about 0.3 to about 3.0.

The ratio of the solid content weight of the ink in each light emitting layer 109 to the average solid content weight of the ink may be in the range of about 0.3 to about 3.0.

Although an organic EL substrate is described in the present embodiment, the patterned substrate of the present invention is not limited to the organic EL substrate. The patterned substrate of the present invention may be a color filter substrate, a plasma display substrate, or the like.

Figure 5:
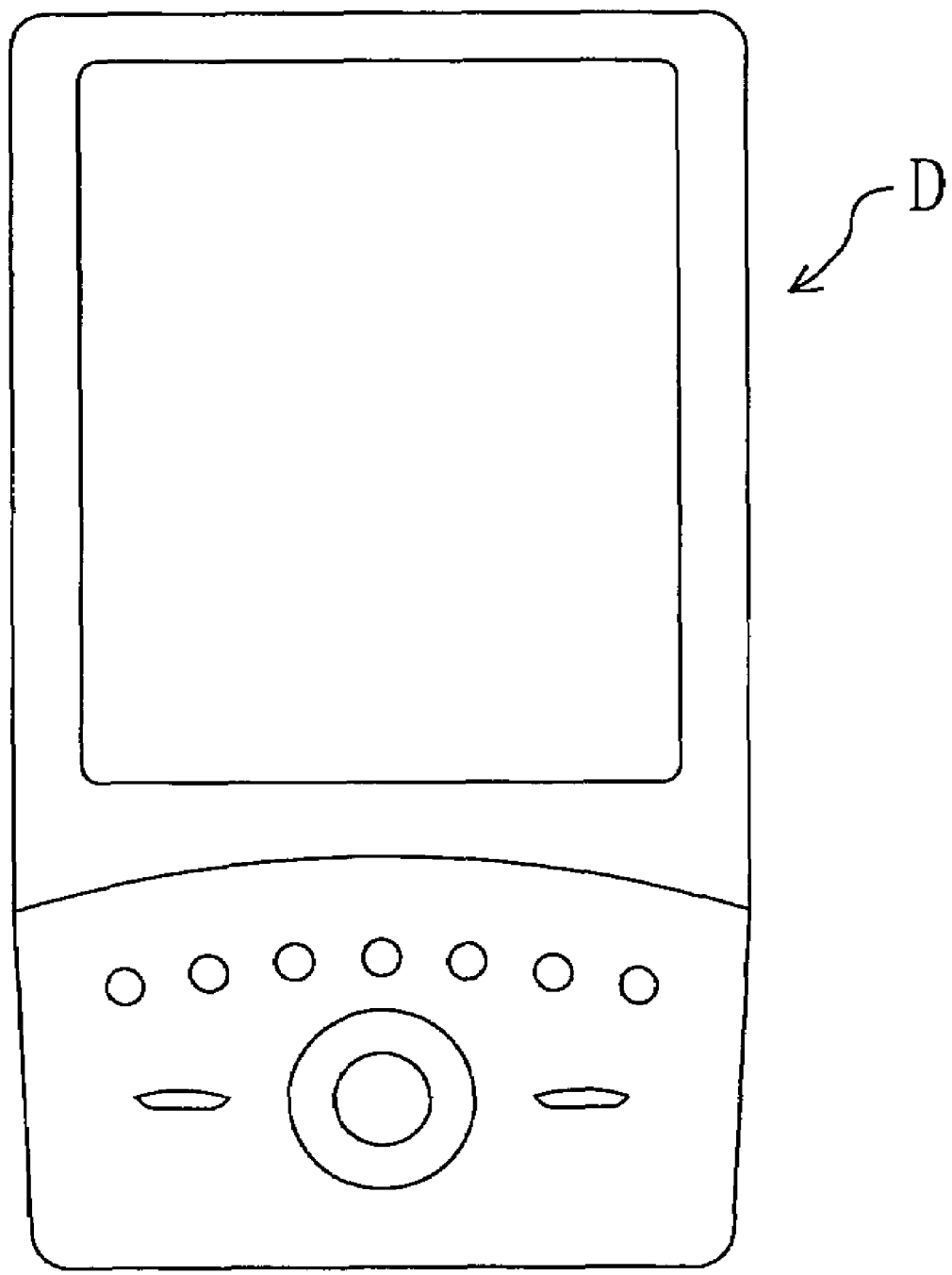
FIG. 5 is a plan view showing the structure of a display device D.
Figure 6:
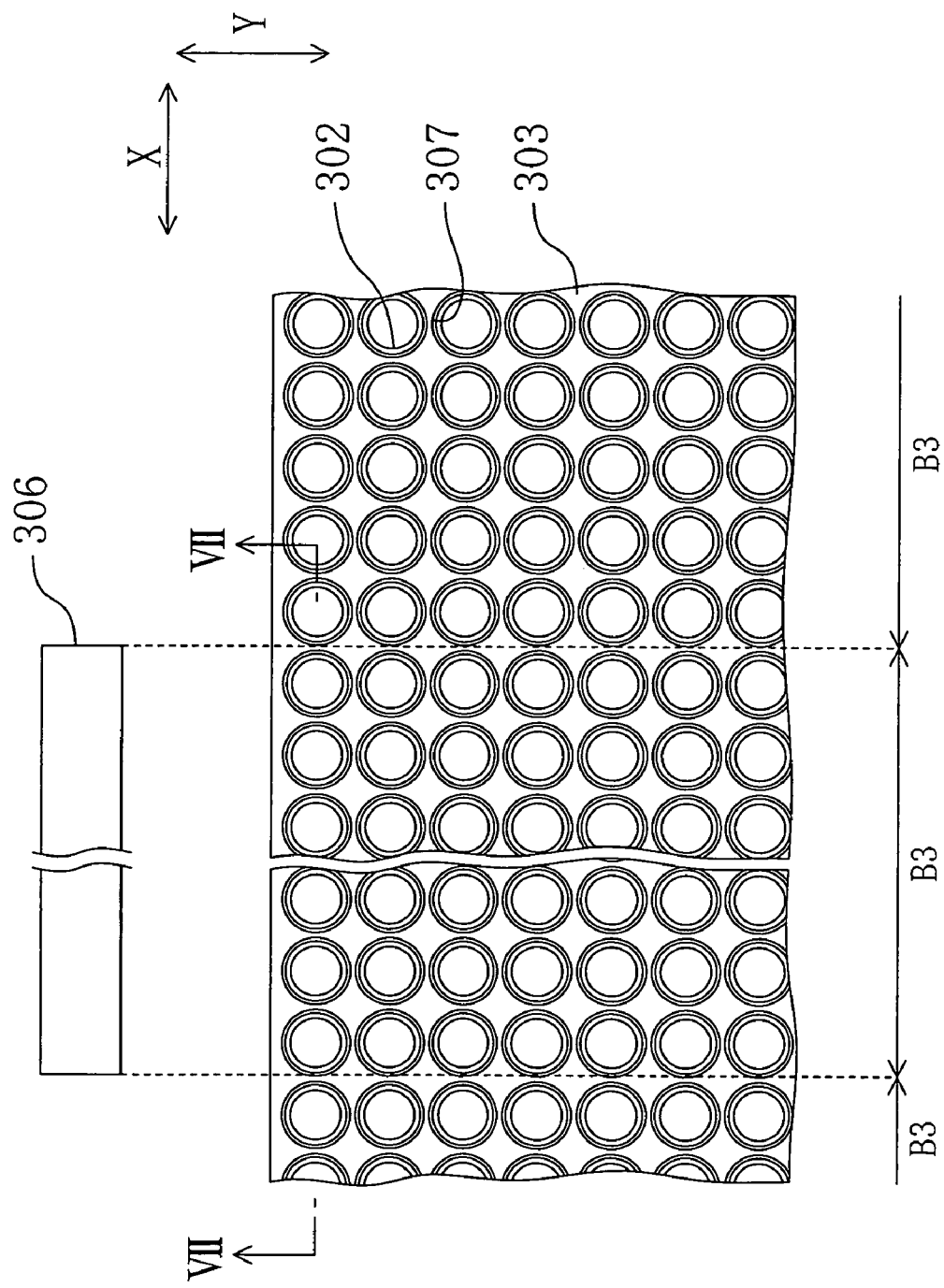
FIG. 6 is a schematic plan view illustrating the step of ejecting ink to ink ejection portions on a main substrate by a conventional ink jet method.
Figure 7:
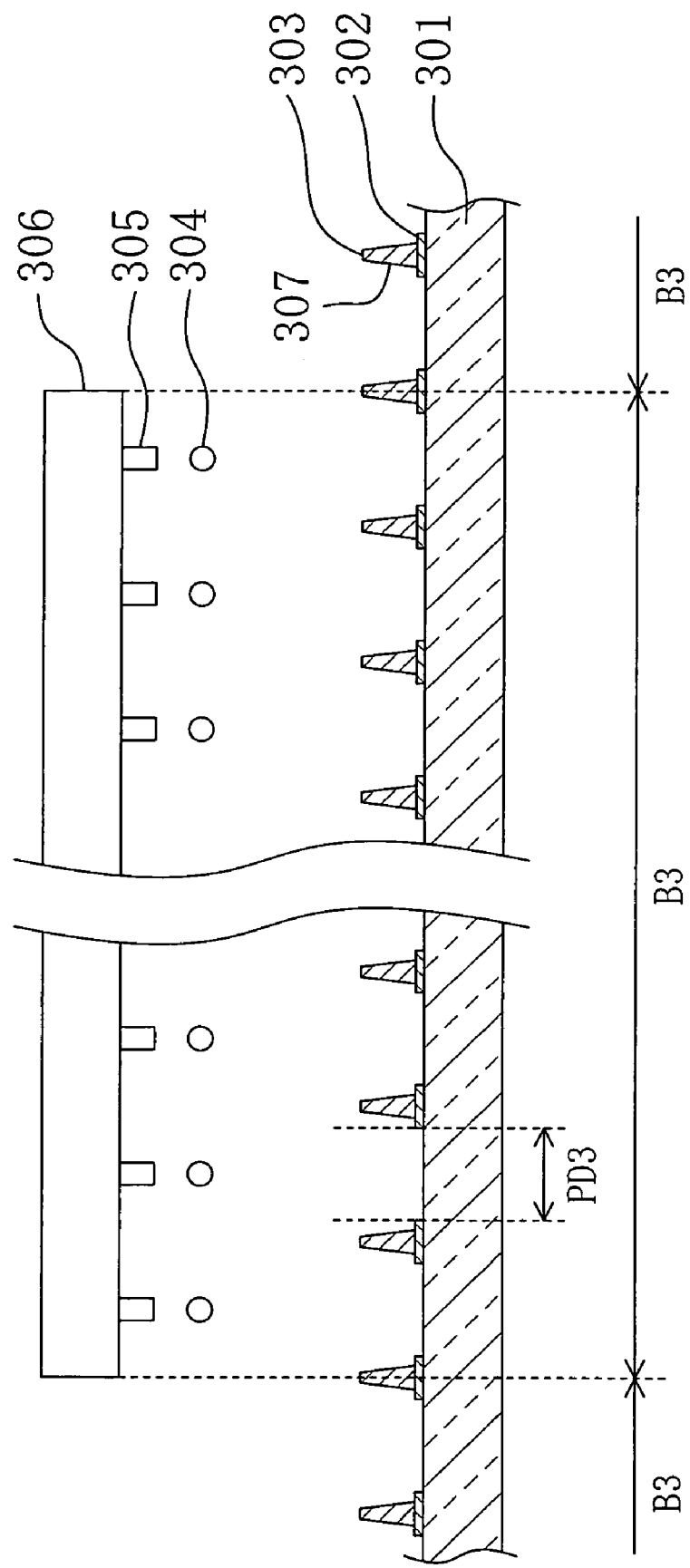
FIG. 7 is an enlarged cross-sectional view taken along line IV-IV in FIG. 6.
Figure 8:
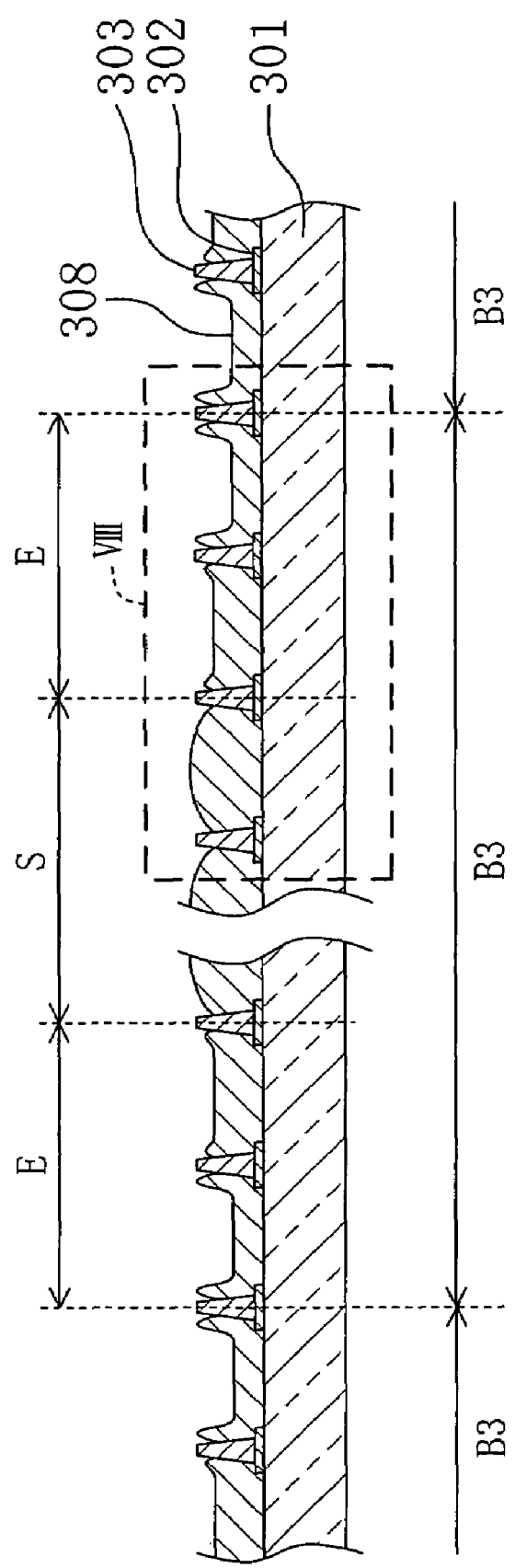
FIG. 8 is a schematic cross-sectional view of a main substrate having ink layers formed by the conventional ink jet method.
Figure 9:
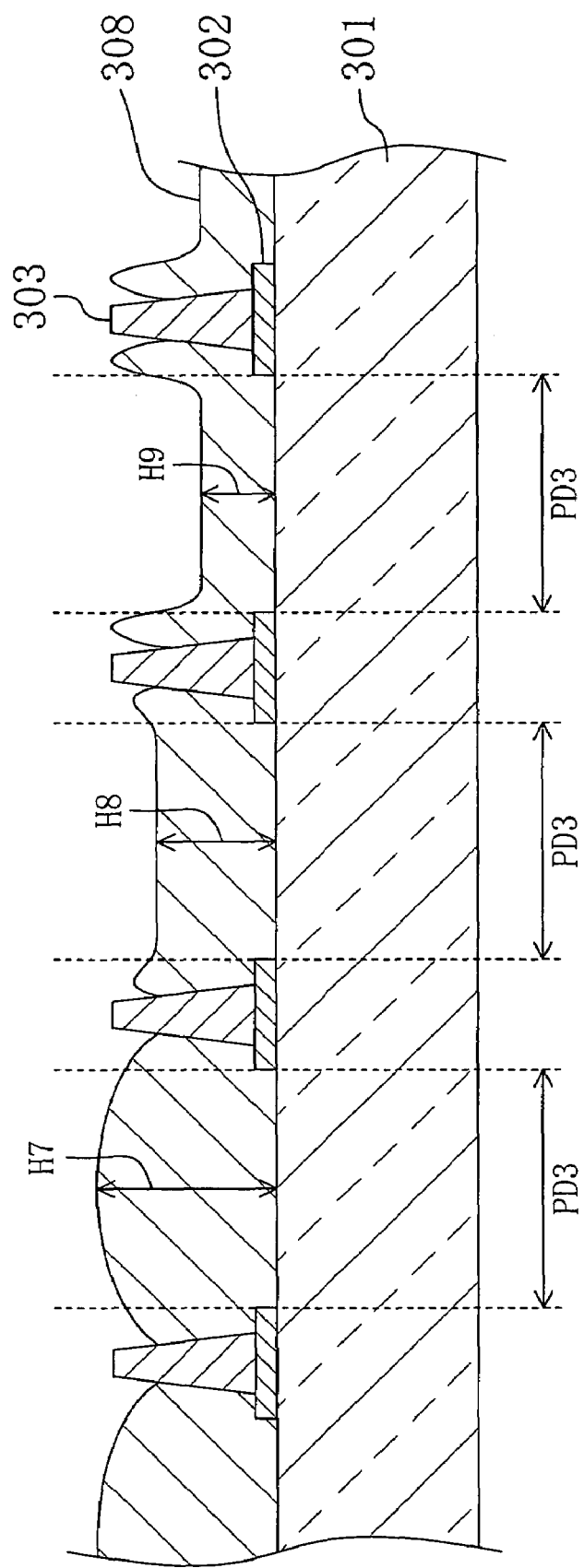
FIG. 9 is an enlarged cross-sectional view of a portion surrounded by dotted line VIII in FIG. 8.

As described above, the organic EL substrate 1 can implement uniform, less uneven light emission. Therefore, a high image quality display device D having reduced display unevenness such as reduced luminance unevenness, reduced color unevenness, and the like can be implemented by using the organic EL substrate 1 (see FIG. 5).

In a color filter substrate produced by the manufacturing method of the present invention, color filter layers have a uniform thickness. Therefore, a high image quality display device having reduced display unevenness such as reduced color unevenness can be implemented by using the color filter substrate produced by the manufacturing method of the present invention.

A display type of the display device of the present invention is not limited specifically. For example, the display device of the present invention may be of a liquid crystal display type, an organic electroluminescent display type, or the like. Hereinafter, an apparatus 2 for manufacturing a patterned substrate according to the present invention will be described.

FIG. 1 illustrates a process of manufacturing the organic EL substrate 1 by using the apparatus 2.

The apparatus 2 of the present invention has an ink jet head 107 having a plurality of ink ejecting nozzles 106; a substrate platform (not shown) for fixing the main substrate 101; a relative position changing means (not shown) for changing the relative positions of the substrate platform and the ink jet head 107; and one or a plurality of ink storage tanks (not shown) connected to the ink ejecting nozzles 106.

The plurality of ink ejecting nozzles 106 are provided corresponding to a plurality of ink ejection portions 111 arranged in a row. For example, the relative position changing means can be formed by a driving device such as a motor which is capable of causing scanning of the substrate platform with the ink jet head 107. The ink storage tank stores ink to be ejected from the ink ejecting nozzles 106 and supplies ink to the ink ejecting nozzles 106 as appropriate. Each ink ejecting nozzle 106 is provided with an ink ejection driving circuit (not shown) for causing ink to be ejected from a corresponding ink ejecting nozzle 106. Each ink ejection driving circuit is formed by a piezo driving device or the like.

By using the manufacturing apparatus 2, the process of ejecting ink droplets 105 to the ink ejection portions 111 on a block B1 by block B1 basis while scanning the main substrate 101 in the Y-axis direction with the ink jet head 107 is repeatedly conducted until ink is ejected to all of the ink ejection portions 111 on the main substrate 101. An organic EL substrate 1 can thus be manufactured.

The internal diameter of the ink ejecting nozzles 106 corresponding to the ink ejection portions 111 in the inner part S of the block B1 may be different from that of the ink ejecting nozzles 106 corresponding to the ink ejection portions 111 in the end parts E of the block B1. With this structure, ink droplet 105 having different solution amounts can be ejected to the ink ejection portions 111 in the inner part S and the end parts E of the block B1. The solid content concentration of the ink in each hole transporting layer 108 in the inner part S of the block B1 can therefore be made different from that of the ink in each hole transporting layer 108 in the end parts E of the block B1. By appropriately adjusting the internal diameter of the ink ejecting nozzles 106 corresponding to the ink ejection portions 111 in the end parts E of the block B1, the thickness H3 in the effective region PD1 of each hole transporting layer 108 of the inner part S can be made approximately the same as the thickness H1, H2 in the effective region PD1 of each hole transporting layer 108 of the end parts E. Accordingly, a uniform organic EL substrate 1 with reduced pattern unevenness can be manufactured.

The ink ejecting nozzles 106 corresponding to the ink ejection portions 111 in the inner part S of the block B1 and the ink ejecting nozzles 106 corresponding to the ink ejection portions 111 in the end parts E of the block B1 may be respectively connected to ink storage tanks which store ink having different solid content concentrations.

In this case, the ink ejecting nozzles 106 corresponding to the ink ejection portions 111 in the inner part S of the block B1 and the ink ejecting nozzles 106 corresponding to the ink ejection portions 111 in the end parts E of the block B1 can eject ink droplets 105 having different solid content concentrations to the ink ejection portions 111. The solid content weight of the ink in each hole transporting layer 108 in the inner part S of the block B1 can therefore be made different from that of the ink in each hole transporting layer 108 in the end parts E of the block B1. By appropriately adjusting the solid content concentration of the ink to be stored in the ink storage tank connected to the ink ejecting nozzles 106 corresponding to the ink ejection portions 111 in the end parts E of the block B1, the thickness H3 in the effective region PD1 of each hole transporting layer 108 of the inner part S can be made approximately the same as the thickness H1, H2 in the effective region PD1 of each hole transporting layer 108 of the end parts E. Accordingly, a uniform organic EL substrate 1 with reduced pattern unevenness can be manufactured.

In the present embodiment, an ink jet nozzle for intermittently ejecting ink is shown as an example of ink ejecting means. In the present invention, however, the ink ejecting means is not limited to the ink jet nozzle. For example, the ink ejecting means may be a nozzle for continuously ejecting ink, which is used in a dispenser method (or a nozzle-printing method).

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A method for manufacturing a patterned substrate having a main substrate, an ink-ejection-portion formation layer formed on the main substrate for forming a plurality of ink ejection portions on the main substrate, and an ink layer formed on each of the plurality of ink ejection portions, comprising the steps of:

ejecting ink to a plurality of ink ejection portions arranged in a row by using a head having a plurality of ink ejecting means corresponding to the plurality of ink ejection portions; and drying the ink which has been ejected in the ink ejection step, wherein in the ink ejection step, ink is ejected so that a solid content weight of the ink in each ink ejection portion is different between an inner part and an end part of the plurality of ink ejection portions arranged in a row.

2. The method according to claim 1, wherein in the ink ejection step, ink is ejected to the plurality of ink ejection portions arranged in a row so that a ratio of a solid content weight of the ink in each ink ejection portion to an average solid content weight of the ink is in a range from about 0.3 to about 3.0.

3. The method according to claim 1, wherein in the ink ejection step, a solution amount per ink droplet to be ejected to each ink ejection portion is made different between the inner part and the end part of the plurality of ink ejection portions arranged in a row.

4. The method according to claim 1, wherein in the ink ejection step, a number of ink droplets to be ejected to each ink ejection portion is made different between the inner part and the end part of the plurality of ink ejection portions arranged in a row.

5. The method according to claim 1, wherein in the ink ejection step, a solid content concentration of the ink to be ejected to each ink ejection portion is made different between the inner part and the end part of the plurality of ink ejection portions arranged in a row.

6. The method according to claim 1, wherein the patterned substrate is an organic electroluminescent substrate or a color filter substrate.

* * * * *